(12) United States Patent
Khunkhun

(10) Patent No.: US 9,737,780 B1
(45) Date of Patent: Aug. 22, 2017

(54) CEILING MOUNTED STRIKING BAG WITH FLEXIBLE FOAM TUBE AND OPTIONAL TETHER SYSTEM

(71) Applicant: Bobby I. Khunkhun, Calgary (CA)

(72) Inventor: Bobby I. Khunkhun, Calgary (CA)

( * ) Notice: Subject to any disclaimer, the term of this patent is extended or adjusted under 35 U.S.C. 154(b) by 0 days.

(21) Appl. No.: 15/621,085

(22) Filed: Jun. 13, 2017

Related U.S. Application Data

(63) Continuation-in-part of application No. 14/713,441, filed on May 15, 2015.

(60) Provisional application No. 61/994,452, filed on May 16, 2014.

(51) Int. Cl.
| | | |
|---|---|---|
| *A63B 69/22* | (2006.01) | |
| *A63B 69/24* | (2006.01) | |
| *A63B 69/34* | (2006.01) | |
| *A63B 69/20* | (2006.01) | |
| *F16M 13/02* | (2006.01) | |

(52) U.S. Cl.
CPC .......... *A63B 69/201* (2013.01); *A63B 69/205* (2013.01); *F16M 13/02* (2013.01); *A63B 2244/102* (2013.01); *A63B 2244/104* (2013.01); *A63B 2244/106* (2013.01)

(58) Field of Classification Search
CPC ....... A63B 69/20–69/208; A63B 69/24; A63B 69/32–69/325; A63B 69/34–69/345; A63B 2244/10–2244/108
USPC ..................................................... 482/83–90
See application file for complete search history.

(56) References Cited

U.S. PATENT DOCUMENTS

| | | | | |
|---|---|---|---|---|
| 1,703,012 A | * | 2/1929 | McNamara .......... | A63B 69/208 482/90 |
| 3,724,845 A | * | 4/1973 | Irby ..................... | A63B 69/205 273/DIG. 30 |
| 3,759,515 A | * | 9/1973 | Crooks ................. | A63B 67/00 273/440 |
| 4,084,812 A | * | 4/1978 | Melrose ................... | A63B 9/00 273/348 |
| 4,491,315 A | * | 1/1985 | Dye ....................... | A63B 69/201 473/442 |
| 4,527,796 A | * | 7/1985 | Critelli ............... | A63B 21/0602 473/442 |
| 4,681,318 A | * | 7/1987 | Lay ..................... | A63B 69/0091 473/423 |
| 4,721,302 A | * | 1/1988 | Murphy .............. | A63B 69/201 473/442 |

(Continued)

*Primary Examiner* — Stephen R Crow
*Assistant Examiner* — Garrett Atkinson
(74) *Attorney, Agent, or Firm* — Kyle R. Satterthwaite; Ryan W. Dupuis; Ade & Company Inc.

(57) ABSTRACT

A striking bag features a resiliently flexible foam tube, and a striking surface that is connected to an end of the flexible tube to hang therefrom in an exposed position strikeable from below. A threaded rod projects from an upper end of the flexible tube for coupling with a surface mount that is fastened to a ceiling or other suitable overhead surface. The surface mount features a rigid portion into which the threaded rod is threaded. The foam of the tube and the threaded rod solely define a resiliency by which the tube flexes and returns to a normal straight position relative to the ceiling mount. A fabric loop at a bottom of the striking surface allows selective connection of a stretchable tether between the striking surface and a ground based tether point to change a responsive character of the striking bag and enable two distinctive modes of use.

20 Claims, 4 Drawing Sheets

(56) References Cited

U.S. PATENT DOCUMENTS

| | | | | |
|---|---|---|---|---|
| 4,903,966 | A * | 2/1990 | Liao | A63B 69/0091 473/423 |
| 5,324,227 | A * | 6/1994 | Yuh-Ching | A63H 33/009 446/473 |
| 5,330,403 | A * | 7/1994 | Kuo | A63B 69/208 482/83 |
| 5,792,032 | A * | 8/1998 | Williams | A63B 69/34 482/83 |
| 6,027,435 | A * | 2/2000 | Nadorf | A63B 69/208 482/146 |
| 6,080,089 | A * | 6/2000 | Nicholson | A63B 69/208 248/519 |
| 6,390,958 | B1 * | 5/2002 | Chu | A63B 69/20 482/83 |
| 6,398,697 | B1 * | 6/2002 | Nichols, Jr. | A63B 69/20 473/441 |
| 6,893,384 | B2 * | 5/2005 | Triani | A63B 69/208 482/83 |
| 7,357,760 | B1 * | 4/2008 | Rios | A63B 69/004 473/444 |
| 7,651,447 | B2 * | 1/2010 | Yang | A63B 69/0075 482/82 |
| 7,704,194 | B1 * | 4/2010 | Chen | A63B 69/208 482/83 |
| 7,914,423 | B1 * | 3/2011 | Cogan | A63B 69/208 482/86 |
| 9,095,757 | B2 * | 8/2015 | Corbett | A63B 69/208 |
| 9,227,127 | B2 * | 1/2016 | Vince | A63B 69/004 |
| 2002/0198085 | A1 * | 12/2002 | Wang | A63B 69/20 482/86 |
| 2003/0054904 | A1 * | 3/2003 | Getchell | A63B 69/0024 473/446 |
| 2012/0149534 | A1 * | 6/2012 | Fu | A63B 69/004 482/90 |
| 2013/0109541 | A1 * | 5/2013 | Fu | A63B 69/208 482/90 |
| 2013/0324372 | A1 * | 12/2013 | Cuadrado | A63B 69/20 482/90 |

* cited by examiner

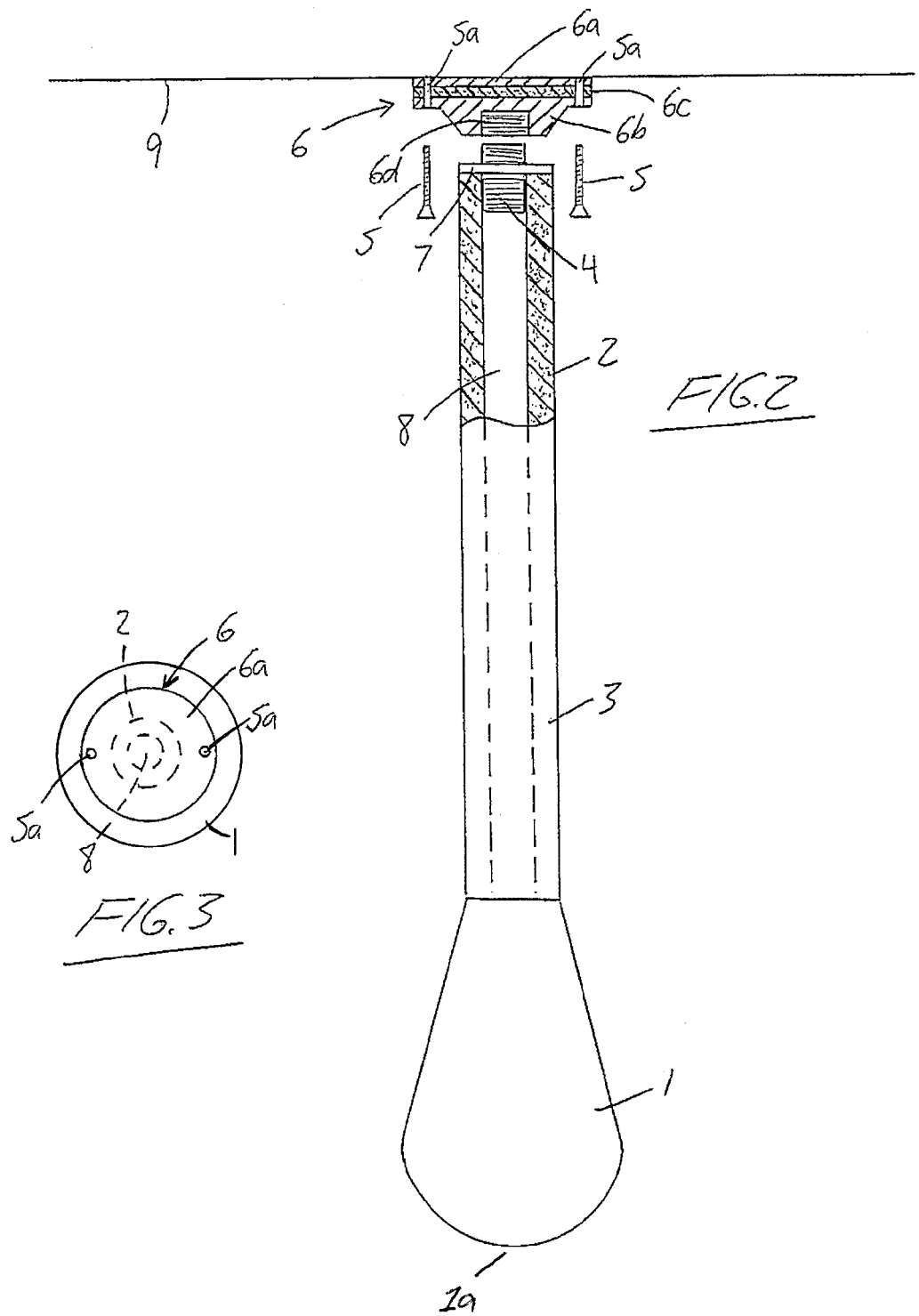

US 9,737,780 B1

CEILING MOUNTED STRIKING BAG WITH FLEXIBLE FOAM TUBE AND OPTIONAL TETHER SYSTEM

CROSS-REFERENCE TO RELATED APPLICATIONS

This application is a continuation-in-part of U.S. Non-provisional patent application Ser. No. 14/713,441, filed May 15, 2015, which claims benefit under 35 U.S.C. 119(e) of U.S. Provisional Patent Application Ser. No. 61/994,452, filed May 16, 2014, both of which are incorporated herein by reference in their entirety.

FIELD OF THE INVENTION

The present invention relates generally to striking bags, and more specifically to a striking bag with a shaped striking surface carried at the bottom end of a hollow flexible tube that is mounted to a ceiling beam or other suitable overhead support.

BACKGROUND

In the fields of boxing and martial arts, it is well known to use a striking bag for various training exercises. However, conventional striking bags are known to have some potential drawbacks, including notable vibration and noise levels when struck/used, and mounting solutions that create complications in installation and relocating a previously installed striking bag to another location, and are not designed to enable temporary removable between uses to free up they space they normally occupy. Conventional striking bags are also not configured for being struck from below, thus preventing practice of upward kicks, uppercuts and other such upwardly exerted strikes. Conventional striking bags are also of relatively fixed, non-changing responsive character, limiting the type of practice that can be performed on a singular piece of equipment.

Accordingly, there remains room for improvement in the field in view of the forgoing, and other, shortcomings in the prior art.

SUMMARY OF THE INVENTION

According to a first aspect of the invention, there is provided an apparatus comprising:

a ceiling mount configured for mounting in an installed position against a ceiling surface and having a threaded lower hole therein, said ceiling mount optionally comprising a foam piece;

a striking bag comprising:
a resiliently flexible tube of foam material configured to have an upper end thereof connected to the ceiling mount to support the resiliently flexible tube in a hanging position extending downwardly therefrom in an axial direction defined by a central axis of the flexible tube;
a threaded rod that is shorter in length than the flexible tube, is received in a hollow opening of the flexible tube at the upper end thereof, is fixed to said flexible tube within the hollow opening thereof, and extends from the upper end of the flexible tube for releasable threaded coupling to the mount at the threaded hole therein, the foam material of the flexible tube and the threaded rod, and optionally the foam piece of the ceiling mount, if included, cooperatively and entirely defining a resiliency of the flexible tube by which the flexible tube is biased into a straight position extending linearly along the central axis; and
a striking surface that is connected to a bottom end of the flexible tube in a position hanging therebeneath and defines a widest portion of the striking bag, an underside of said striking surface being configured to reside in an exposed position unobstructed by the ceiling mount and the resiliently flexible tube and strikeable from below;
wherein, solely by the resiliency of the flexible tube, as cooperatively defined by the foam material and the threaded rod, and optionally the foam piece of the ceiling mount, if included, the striking bag is biased into a default relaxed state in which the flexible tube occupies the straight position extending linearly along the central axis.

In one embodiment, the ceiling mount lacks said foam piece, and the foam material of the flexible tube and the threaded rod cooperatively and entirely define the resiliency of the flexible tube by which the flexible tube is biased into the straight position extending linearly along the central axis.

Preferably the foam material of the flexible tube absorbs noise and dissipates vibration under impact of the striking surface.

In one embodiment, a tether is selectively connectable to said striking surface to reach downward therefrom and connect to a floor-based tether point so that said tether constrains movement of the striking surface relative to said tether point for use of the apparatus in a second mode of operation in which said tether contributes to the resiliency of the flexible tube.

Preferably, the striking surface, at a central location at the underside thereof, comprises a fabric loop by which the tether is selectively connectable to said striking surface to reach downward therefrom and connect to the floor-based tether point.

Preferably said floor based tether point comprises a weight configured for non-anchored placement on a ground surface, and featuring a connection point on said weight for said tether.

According to a second aspect of the invention, there is provided a method of using the forgoing apparatus of the tether-equipped embodiment, said method comprising:

using the striking bag without the tether in a first mode of operation, in which the resiliency of the flexible tube is defined solely by the flexible tube and the threaded rod, and optionally the foam piece of the ceiling mount, if included, wherein said use in the first mode includes impacting the striking surface from below; and subsequently connecting the tether between the the striking bag and the ground based tether point and using the striking bag in the second mode of operation, in which impact of the striking surface from below is obstructed by presence of the tether, while a responsive character of the striking bag is modified compared to the first mode due to added constraint of the striking bag's movement by the tether.

According to a third aspect of the invention, there is provided an apparatus comprising:

a ceiling mount configured for mounting in an installed position against a ceiling surface and having a threaded hole defined in a stationary position at an underside of the ceiling mount in a rigid portion thereof;

a striking bag comprising:
a resiliently flexible tube of foam material configured to have an upper end thereof connected to the ceiling mount to support the resiliently flexible tube in a hanging position extending downwardly therefrom in an axial direction defined by a central axis of the threaded hole of the ceiling mount;

a threaded rod that is shorter in length than the flexible tube, is received in a hollow opening of the flexible tube at the upper end thereof, is fixed to said flexible tube within the hollow opening thereof, and extends from the second opposing end of the flexible tube for releasable threaded coupling to the mount at the threaded hole therein to hold said threaded rod in stationary relation to the rigid portion of the mount, the foam material of the flexible tube and the threaded rod cooperatively and entirely defining a resiliency of the flexible tube, relative to the rigid portion of the ceiling mount, by which the flexible tube is biased into a straight position extending linearly along the central axis; and a striking surface that is connected to a bottom end of the flexible tube in a position hanging therebeneath and defines a widest portion of the striking bag, wherein an underside of the striking surface is configured to reside in an exposed position unobstructed by the ceiling mount and the resiliently flexible tube and strikeable from below;

wherein, solely by the resiliency of the flexible tube relative to the rigid portion of the mount, as cooperatively defined by the foam material and the threaded rod, the striking bag is biased into a default relaxed state in which the flexible tube occupies the straight position extending linearly along the central axis.

In one embodiment, the ceiling mount is entirety rigid throughout.

In one embodiment, the rigid portion of the ceiling mount comprises a rigid plate.

In one embodiment, said ceiling mount comprises only said rigid plate.

In one embodiment, an entirety of said ceiling mount is metal.

In one embodiment, the apparatus is configured for optional tethered use in the same manner recited above concerning the first aspect of the invention.

According to a fourth aspect of the invention, there is provided a method of using the tether-equipped embodiment of the third aspect of the invention, said method comprising:

using the striking bag without the tether in a first mode of operation, in which the resiliency of the flexible tube is defined solely by the flexible tube and the threaded rod, wherein said use in the first mode includes impacting the striking surface from below; and subsequently connecting the tether between the striking bag and the ground based tether point and using the striking bag in the second mode of operation, in which impact of the striking surface from below is obstructed by presence of the tether, while a responsive character of the striking bag is modified compared to the first mode due to added constraint of the striking bag's movement by the tether.

BRIEF DESCRIPTION OF THE DRAWINGS

Preferred embodiments of the invention will now be described in conjunction with the accompanying drawings in which:

FIG. 2 is a partially exploded front elevation view of a first embodiment of the striking bag and associated mount.

FIG. 3 is an overhead plan view of the first embodiment striking bag of FIG. 2.

In the drawings like characters of reference indicate corresponding parts in the different figures.

DETAILED DESCRIPTION

Figure 1:
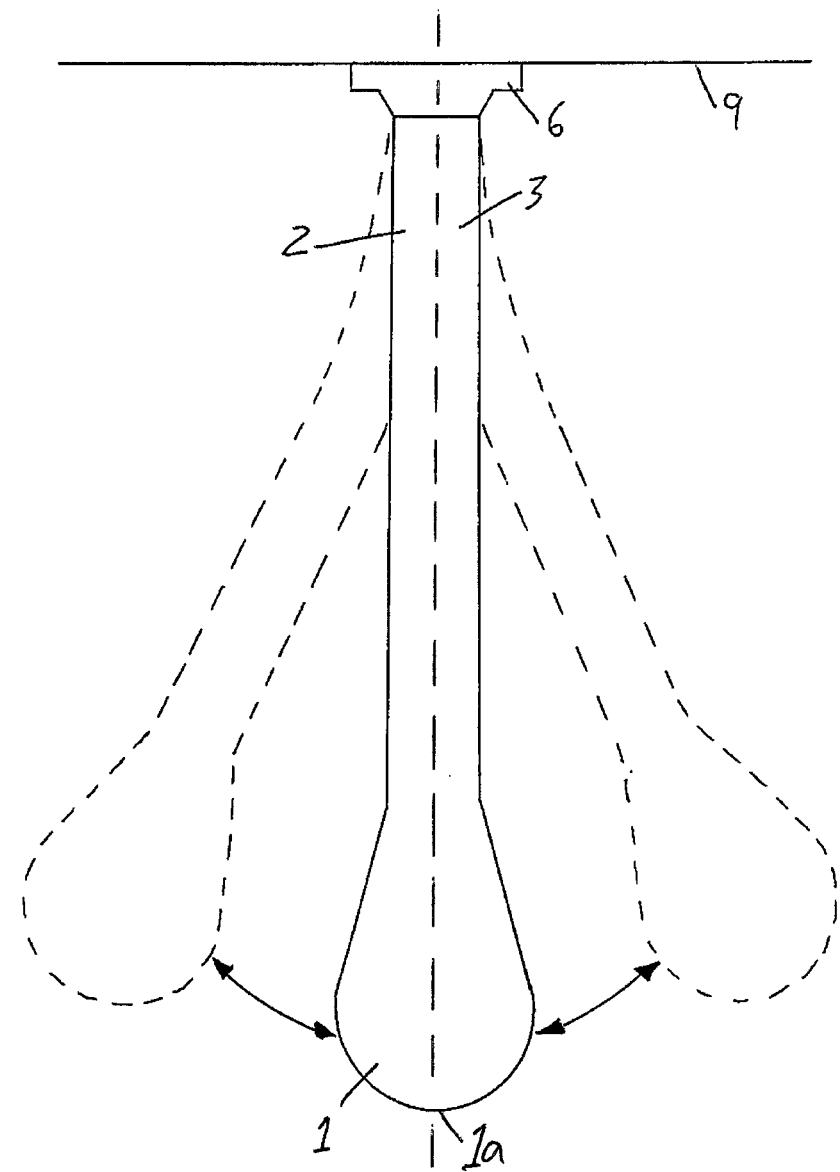
FIG. 1 is a front elevation view of a striking bag and associated mount according to the present invention, and uses broken lines to illustrate motion of the striking bag, the range of which is not drawn to scale and may be greater than that which is shown.

The drawings illustrate a novel striking bag according to one embodiment of the present invention. The top ¾ (approximately) of the striking bag is a long, hollow cylindrical tube 2 made from resiliently flexible foam. A central axis A of the cylinder defines an axial direction of the striking bag, on which the cylindrical tube normally extends linearly in its default, relaxed state. A threaded rod 4 extends out from the top center hole of the cylindrical tube in the axial direction. An exposed end of the threaded rod 4 is situated externally of the flexible tube 2 beyond the upper end, and is screwed into a threaded lower opening of a surface mount 6. The illustrated mount is a circular disk-like object that can be attached to an overhead support surface 9, such as a ceiling, by the use of screws 5, though the disc shape need not be circular, as may instead have an oblong elliptical, oval or football-like shape, or even straight sided shapes such as square or rectangular. At the lowest point of the cylindrical tube, the striking bag begins to flare outwards and increases in size to a maximum diameter across the central axis, from which the bag then transitions to a hemispherical shape at the lowest point of the entire structure.

A striking surface 1 defines a widest and lowest portion of the striking bag. The bottom half of the striking surface 1 is hemispherical in shape. The top half of the striking surface 1 is elongated and tapers upwardly in size, in comparison to the bottom half. More specifically, in an upward direction along the central axis of the flexible tube 2, the tapered top half of the striking surface 1 decreases in diameter measured across the central axis. The smallest circumference of the striking surface 1 is at the top or the highest point of said striking surface 1, where it meets with the lower end of the flexible tube 2. The striking surface 1 has an overall teardrop shape resulting from the combination of its tapered upper half and spherically contoured, for example hemispherically shaped, lower half. Material options for the body that defines the striking surface include foam, sponge, or an air bladder. In instances where the striking surface is foam, it may be molded together as a single, unitary, seamlessly integral component with the flexible tube 2. It will be appreciated that the word "half" is being used herein not to necessarily denote two parts of equal proportion (whether in mass, volume, or other measure), but in the more general sense of two parts that combine to make a whole.

Upholstery 3 is a piece of fabric or other material used to form a singular cover that encases multiple parts of the striking bag, including the striking surface 1, the flex tube 2 and a washer 7. Some examples of materials that may be used are: vinyl, leather, nylon. The threaded rod 4 is inserted into the flex tube 2 and used to connect the flex tube 2 to the surface mount 6. Some examples of materials that may be used for the threaded rod 4 are: plastic, rubber, or metal. Threaded fasteners (screws or bolts) 5 secure the surface mount 6 to the intended overhead, horizontal mounting surface, such as a ceiling. In one embodiment, shown in FIG. 2, the surface mount 6 features two metal plates or discs 6a, 6b that are stacked together on opposing sides of a disc-shaped piece 6c of foam, rubber, polyurethane or other resiliently compressible material received in a sandwiched position between the two plates. The top plate 6a abuts against the support surface 9. The surface mount 6 has a threaded hole 6d in the bottom plate which allows the threaded rod 4 to be connected to it. Fastener holes run through the full mount (i.e. fully through the 2 metal plates and the foam disc therebetween) from north to south (i.e. top to bottom). The diameter of the inside hole of the washer 7 is slightly larger than the outside diameter of threaded rod, so that the threaded rod can pass through the washer. In another embodiment shown in FIG. 4, the mount features only a single plate 6b on the side of the foam piece 6c opposite the support surface 9. In yet another embodiment shown in FIG. 5, the foam piece is omitted entirely, giving the mount a purely metal construction.

The striking surface 1 and the flex tube 2 are connected by the upholstery 3, which encases both the striking surface 1 and the flex tube 2. In addition to the upholstery 3, the striking surface 1 and flex tube 2 can be connected to one another using glue, heat (foam to foam), a dowel, or a threaded rod, or could be molded or manufactured as one piece. The upholstery 3 encases the striking surface 1, the flex tube 2, and the washer 7. The upholstery 3 has a hole that overlies that of the washer 7 to allow the threaded rod 4 to pass through the washer and the upholstery 3 at the top of the flex tube 2. The threaded rod 4 is inserted into the hollow opening of the flex tube 2 and extends outwards past the end of the flex tube 2. The threaded rod 4 may be secured to the flex tube 2 by glue, as is the case for the first embodiment of FIG. 2, or by gluing one or more foam sheets 10 to the threaded rod 4 in positions wrapped circumferentially therearound so that the now-padded rod fits snugly inside the flex tube, as shown in the second embodiment of FIG. 4, and then adding glue to the contact points between the flex tube 2 and the foam wrapped around the threaded rod 4. The screws 5 are inserted axially through the screw openings of the surface mount 6 and drilled into a support surface, such as a ceiling support beam. The screws, bolts or fasteners 5 attach the surface mount 6 to the support surface. The threaded hole within the bottom plate of the surface mount 6 allows for the threaded rod 4 to be screwed into the surface mount 6 from below. The washer 7 is connected to the threaded rod. The washer 7 can be connected to the threaded rod by: manufacturing them together, using two nuts 11 to clamp the washer between the nuts 11 at an intermediate location along the threaded rod, by creating a wider section on the threaded rod 4 where the washer 7 would rest, or by gluing the washer to the foam to indirectly connect the threaded rod and washer together via their respective adherence to the foam. The threaded rod can also be used to staple/anchor the washer to the upholstery by having a widened area on the rod that resides over the washer to clamp it down atop the flex tube Regardless of how it is secured to the rod, the washer creates an effective flange projecting radially outward from the threaded rod. The threaded rod 4 is inserted into the flex tube 2, until the washer 7 rests on the upper section of the flex tube 2. The washer 7, striking surface 1, and flex tube 2 are covered with upholstery 3, which secures the washer 7 to flex tube 2 by encasing them together within the singular cover. While in the finished product the cover is a singular entity, it may be sewn together from multiple pieces or panels of material suitably sized and shape to cooperatively cover the teardrop or other non-planar shape of the striking surface in a conforming manner.

The resulting striking bag is a striking device where the striking surface 1 is intended to be struck using various punching, kicking, kneeing and elbow strikes. The striking surface 1 is connected to the flex tube 2. When the striking surface 1 is struck in a direction transverse to the central axis, the striking surface 1 will travel in the same direction of the strike. The impact of the strike travels into the flex tube 2 and causes a flex and/or bend throughout the flex tube 2. The resiliency of the material used for the flex tube 2 causes it to respond to any impact or movement by returning back into the direction of the strike and quickly returning back to its original and resting position. As shown in the drawings, the bottom or underside 1a of the striking surface resides in an exposed position unobstructed by the ceiling mount and the resiliently flexible tube. This way, the underside of the striking surface is strikeable from below, allowing practice of uppercuts, upward kicks, upward elbows, upward knees, or other maneuvers not accommodated by conventional punching bags.

The surface mount 6 anchors the striking bag to a support surface, such as a ceiling beam. The screws or bolts 5 are inserted into the surface mount screw holes 5s and screwed into the support surface. The screw holes of the surface mount pass axially through the entirety thereof at a radial distance outward from the threaded hole at the center of the mount. The entire screw travels through the surface mount 6, except for the screw head. The screw head of the screw 5 does not pass through the screw openings of the surface mount 6, and therefore it clamps or fastens the surface mount 6 to the support surface. Once the surface mount 6 is securely attached to the support surface the remainder of the striking bag can be attached to the surface mount 6. In one possible assembly option, unless the washer and threaded rod were previously combined, the threaded rod 4 is then inserted into the washer 7 and the washer 7 is attached to the threaded rod 4, for example using nuts 11. The threaded rod 4 is inserted into the hollow opening 8 of the flex tube 2 until the washer 7 is resting on the top of the flex tube 2, for example after wrapping foam sheets around the threaded rod 4 below the washer and putting glue inside the hole at the top of the flex tube. In another possible assembly option, the washer and the threaded rod are instead individually adhered to the flex tube 2. The threaded rod extends past the end of the flex tube, allowing the threaded rod to be screwed into the surface mount. The upholstery 3 is used to tightly secure items of the striking bag together. The striking surface 1, flex tube 2, and washer 7 are all securely encased in the upholstery 3. A hole in the upholstery 3 allows the threaded rod 4 to pass through the washer and upholstery. This hole in the upholstery 3 therefore allows the threaded rod 4 to be connected to the surface mount 6 while also being secured to the flex tube 2 connected via the threaded rod's connection to the washer 7 and the washer's secured state on the flex tube 2 due to the upholstery 3. When the threaded rod 4 is threaded into the mount 6, the annular area of the upholstery spanning over the washer 7 and around the threaded rod 4 at the top end of the flex tube 2 may be clamped in place between the washer and the underside of the mount 4. Alternatively, the fully threaded advancement of the threaded rod into the mount may be leave a gap between the washer and the mount in which the annular area of the upholstery is accommodated in an unclamped fashion.

The striking bag has the ability to flex and bend when the striking surface 1 is struck or moved from the resting position. The farther the striking surface is moved from its resting position the more the flex tube 2 will flex and bend. This movement allows for reflex, accuracy and timing training by striking the striking surface while it is in motion. This movement allows for defensive training because of the ability of the striking surface to travel into the direction of the striker. The longer the threaded rod, the further it reaches downwardly within the hollow interior of the flex tube, and the more resistance it provides to the flexing of the tube. Accordingly, increasing the length of the threaded rod used will reduce the striking bag's range of movement, and thus reduce the amount of reaction time it takes for the bag to spring back from its flexed position after being hit, i.e. increasing the effective "speed" of the bag.

Figure 4:
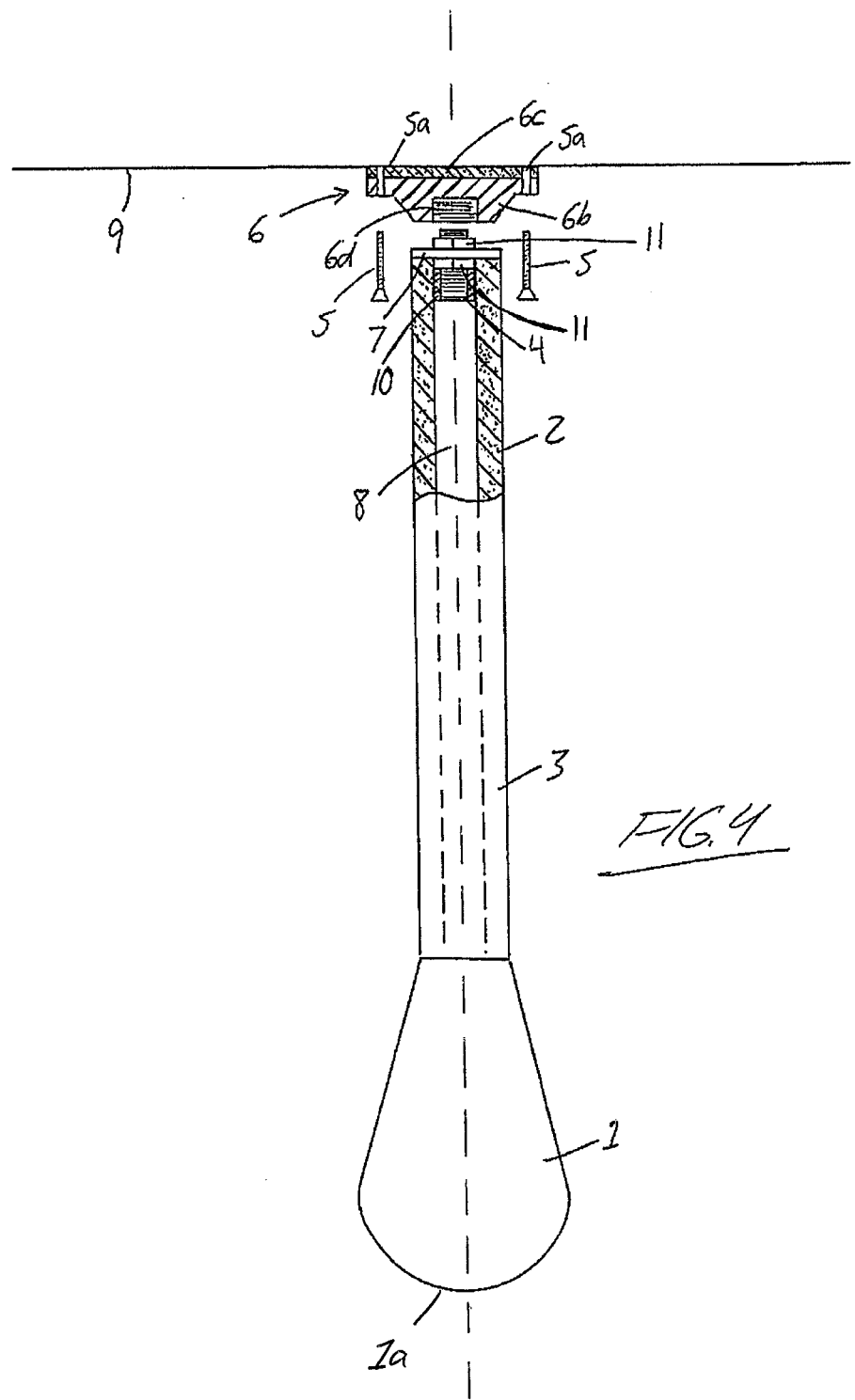
FIG. 4 is a front elevation view of a second embodiment of the striking bag in its normal, static position when not in use.

The flex tube 2 is a one piece foam tube, for example an extruded foam tube, similar to a polyethylene extruded tube or foam pool noodle. The striking surface 1 can be made from molded foam, an air filled ball, cloth ball or an air bladder in the desired shape. The threaded rod 4 is preferably made of metal, but alternatively can be made from plastic, rubber or vinyl, for example, and in any case is more rigid than the foam material of the flex tube. The threaded rod 4 has a width that tightly fits into the hole or bore that runs axially through the flex tube 2 when the threaded rod 4 is inserted into the flex tube 2, thereby providing a frictional grip between the external threads of the rod 4 and the surrounding flex tube 2. The washer 7 can be attached to the threaded rod 4 using two nuts lion the top and bottom of the washer 7 in the desired location on the threaded rod 4, as shown in FIG. 4. The washer 7 can also be attached to the threaded rod 4 by manufacturing both items together as seamlessly integral parts of a unitary piece, or by gluing them together, as shown in FIG. 2, or by creating a wider section on the threaded rod 4 where the washer 7 would rest. The flex tube 2, striking surface 1 and washer 7 are securely connected by encasing them in the upholstery 3. The upholstery 3 can be anchored directly to the washer 7, or to a separate member that rests on top of the washer 7, for example. The washer may be a standard metal washer, for example to which the upholstery is adhered, or may be made of other materials, such as plastic or wood, in which case the upholstery may be fastened to the washer by staples, for example. In one embodiment, the washer is a metal washer, and the separate member to which the upholstery is attached is a wooden washer to which the upholstery is stapled. In other embodiments, the washer may be omitted altogether, with the upholstery simply being sewn closed around the threaded rod. The upholstery 3 has a hole to allow the threaded 4 rod to travel through it. The surface 6 mount can be produced in metal, rubber or plastic (e.g. polyurethane) or other material of greater rigidity than the foam of the flex tube. If metal is used the mount can be machined. If plastic or rubber is used the mount can be molded.

While the illustrated embodiments employ two initially separate pieces for the flex tube 2 and the striking surface 1, the flex tube and striking surface may be molded together as seamlessly integral parts of a single unitary piece using techniques such as direct injection molding.

In summary of the illustrated embodiments, a striking bag is removably mounted on a horizontal support surface, such as a ceiling. The lowest part of the bag has the largest surface area and is intended to be struck. The striking surface 1 and flex tube absorb and dissipate vibration and noise when struck. In the illustrated embodiment, foam is used throughout the striking bag, or at least for the hollow flexible tube from which the striking surface is suspended, and the foam's resiliency along with the threaded rod gives the striking bag the ability to return to its resting position quickly and with force when struck. The striking bag is attached directly to the mount and the mount attached to a support surface. The range of motion and flexibility provide a variety of training options. The inventive striking bag provides the functionality and training options of multiple striking bags on the market today, such as: speed bags, slip bags, double ended bags, and reflex bags. In at least some embodiments, the striking surface is softer than traditional punching bags. The striking bag may create less vibration and noise than traditional striking bags that are horizontally mounted. The striking bag can be quickly and easily removed from the mount simply by unthreading the rod 4 therefrom. The striking bag may be used to increase cardio, speed, reflexes and striking technique for anyone from expert martial artists to novices. The striking bag can be employed to train anyone on martial arts and boxing techniques using punches, kicks, knees and elbows, for example to improve a user's accuracy, timing and reflexes in various martial arts and boxing strikes.

While the illustrated embodiment features a tapered striking surface that is generally tear-dropped in shape, other embodiments may employ striking surfaces of other shape, e.g. spherical or cylindrical, that likewise are greater in diameter than the flex tube from which they are suspended, and define the widest point of the overall striking bag.

It will be readily appreciated to one of ordinary skill in the art from the forgoing description of the embodiments shown in FIGS. 1 to 4, that in both of these embodiments, the resiliency of the striking bag relative to the ceiling mount is defined solely and entirely by cooperation between the resilient flexibility of the tube's foam and the rigidity of the metal threaded rod 4 that is held stationary relative to the rigid metal bottom plate 6b of the ceiling mount 6 by the threaded connection thereto at threaded hole 6d. Similarly, the resiliency of the striking bag relative to the ceiling surface 9 is contributed primarily by this cooperation between the foam tube and the threaded rod, with any remaining contribution being imparted by the optional foam piece 6c of the ceiling mount. In both embodiments, no springs are employed in any manner, neither inside the flexible tube nor in the connection thereof to the ceiling mount. The resilient action tending to the return the flexible tube to its default relaxed state lying linearly on the central axis A thus relies only on the interaction between the one or more resilient foam pieces (foam tube 2, and optional disc 6c if included) and corresponding rigid pieces (metal threaded rod 4, metal plate(s) 6a, 6b). This resiliency based on the bending of the foam against the rigid threaded rod imparts a response or feel of notably different character than spring-based designs, while reducing the total part count and allowing use of an empty flex tube 2 that is fully void of any internal components other than threaded rod 4. Additionally, noise is reduced compared to designs employing vibrating metal springs.

Figure 5:
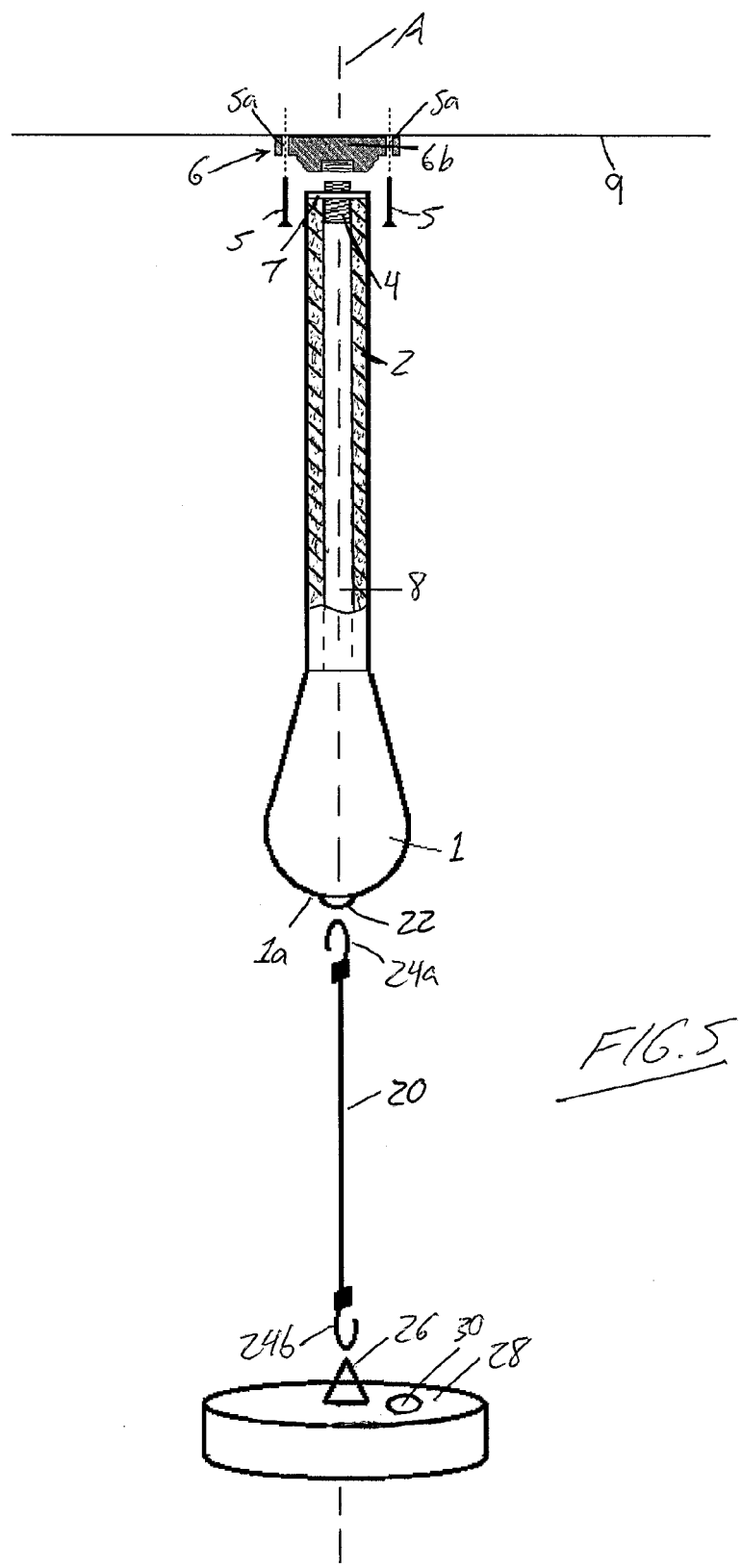
FIG. 5 is a front elevational view of a third embodiment of the striking bag in its normal static position, and demonstrating connection of an optional tether system thereto to enable use of the striking bag in a second operational mode providing different responsive character.

FIG. 5 illustrates a third embodiment in which the ceiling mount 6 omits the foam piece 6c of the other illustrated embodiments, instead featuring only the same singular metal plate 6b of FIG. 4, but mounted in directly abutting contact with the ceiling surface 9, whereby the resiliency of the striking bag, when used in a first mode of operation free of the optional tether described below, is defined entirely and solely by the foam tube 2 and stationary, rigid rod 4.

A second mode of operation is initiated by selective connection of an optionally included, or separately obtained, tether cord 20 to the striking bag to introduce an additional constraint to the motion of the bag when struck. To enable connection of the tether cord 20, a fabric anchor loop 22 is sewn to the cover of the striking bag at the lowermost point thereof that lies centrally of the striking surface where the central axis A intersects the underside of the striking surface. The fabric may, for example, be made of canvas, nylon or other woven or non-woven fabric. This use of a fabric loop, as opposed to a metal loop, ensures that the user of the bag cannot be injured when striking the bag from below during use in the first operational mode.

The tether cord 20 is a bungee cord or other flexible and axially-stretchable cord equipped with a respective hook 24a, 24b or other type of connector at each end. To prepare the striking bag for use in the second mode, the top connector hook 24a at the top end of the tether cord 20 is connected to the fabric anchor loop 22 of the striking bag, and the bottom connector hook 24b at the bottom end of the tether cord 20 is connected to a ground-based anchor point 26. In the illustrated example, the anchor point 26 is a metal anchor loop affixed to an anchor weight 28 that is seated upon the floor in a centered position aligned under the relaxed striking bag on central axis A. The weighted anchor 28 may be a weighted bag or container filled with sand, water or other ballast, a plate or disc of metal or other notably dense material, or any other unit of significant weight placed atop the floor to hold the anchor point 26 stationary solely without any fastened attachment to the floor.

For cost effectiveness and convenience, it may be preferable that the weighted anchor 28 employ a manufacturer-provided openable/closeable bag or container that can be selectively filled with ballast by the purchaser, installer or user of the striking bag, thereby avoiding the need to ship or transport a heavy plate, disc or other substantive structure. A openable/closeable fill and drainage opening in the anchor weight is schematically shown at 30, and may be a selectively plugged or capped fill port for poured introduction and draininage of liquid ballast (e.g. water), or an access hole for introduction of sand or other granular ballast and optionally having a selectively closeable door, flap, fastener (e.g. zipper, button(s), hook and loop fabric, etc.) or combinations thereof to normally keep the access hole closed. Though a hard-walled container of rigid shape may be used, a bag or other flexible, foldable or collapsible container may be preferable for space and cost efficient transport in a compact state. In the instance of a bag-based anchor weight, the anchor weight may have a two-piece construction featuring a flexible outer shell with an openable access (e.g. zipper closure), and an internal bag or bladder contained within the outer shell. This way, the filling hole or spout would not have to be exposed on the outside of the anchor weight. The internal bag/bladder may be removable and replaceable with a water or ballast fillable kettlebell, dumbbell or other weighted object with one or more handles for convenient, comfortable lifting.

In another embodiment, floor-based anchor point 26 may instead be affixed to the floor itself, omitting the need for the anchor weight 28. However, use of an anchor weight that lacks any fastened attachment to the floor and relies only on its own weight to maintain a stationary position centered below the ceiling mount has the advantage of requiring no modification to the floor, thereby avoiding creation of a tripping hazard and avoiding a marred floor appearance should the fastened anchor point be removed.

Connected in a partially stretched condition between the stationary floor-based anchor point 26 and the striking bag's fabric loop 22, the stretchable tether cord 20 exerts a downward pulling force on the central lowermost point of the striking surface 1. Accordingly, when the striking surface is punched or kicked, elbowed or kneed causing it to swing outwardly from its relaxed position normally centered under the ceiling mount 6, the resistance to this motion and the biased return motion back to the relaxed position is no longer solely provided by the cooperation of the tube's foam and threaded rod (and optionally the foam piece of the ceiling mount, if included). Instead, the overall resiliency is augmented by the tension of the stretched tether cord 20, which pulls the striking surface 1 back toward its central relaxed position.

Accordingly, in the tethered second mode of operation, the striking bag has more resistance to strike-induced motion, and faster response, i.e. tending to swing more quickly back to the relaxed central position, and also reduces the degree of overshoot past the relaxed position. Accordingly, by selective attachment and detachment of the optional tether cord, the responsive character of the striking bag can be modified for different modes of use, though with the realization that in the tethered second mode of operation, the underside of the striking surface is not accessible to direct strikes due to the presence of the tether cord reaching downward from the underside of the striking bag.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. An apparatus comprising:
   a ceiling mount configured for mounting in an installed position against a ceiling surface and having a threaded lower hole therein, said ceiling mount optionally comprising a foam piece;
   a striking bag comprising:
      a resiliently flexible tube of foam material configured to have an upper end thereof connected to the ceiling mount to support the resiliently flexible tube in a hanging position extending downwardly therefrom in an axial direction defined by a central axis of the flexible tube;
      a threaded rod that is shorter in length than the flexible tube, is received in a hollow opening of the flexible tube at the upper end thereof, is fixed to said flexible tube within the hollow opening thereof, and extends from the upper end of the flexible tube for releasable threaded coupling to the mount at the threaded hole therein, the foam material of the flexible tube and the threaded rod, and optionally the foam piece of the ceiling mount, if included, cooperatively and entirely defining a resiliency of the flexible tube by which the flexible tube is biased into a straight position extending linearly along the central axis; and
      a striking surface that is connected to a bottom end of the flexible tube in a position hanging therebeneath and defines a widest portion of the striking bag, an underside of said striking surface being configured to reside in an exposed position unobstructed by the ceiling mount and the resiliently flexible tube and strikeable from below;

wherein, solely by the resiliency of the flexible tube, as cooperatively defined by the foam material and the threaded rod, and optionally the foam piece of the ceiling mount, if included, the striking bag is biased into a default relaxed state in which the flexible tube occupies the straight position extending linearly along the central axis.

2. The apparatus of claim 1 wherein the ceiling mount lacks said foam piece, and the foam material of the flexible tube and the threaded rod cooperatively and entirely define the resiliency of the flexible tube by which the flexible tube is biased into the straight position extending linearly along the central axis.

3. The apparatus of claim 1 wherein the foam material of the flexible tube absorbs noise and dissipates vibration under impact of the striking surface.

4. The apparatus of claim 1 wherein the striking surface, at a central location at the underside thereof, comprises a fabric loop by which a tether is selectively connectable to said striking surface to reach downward therefrom and connect to a floor-based tether point so that said tether constrains movement of the striking surface relative to said tether point for use of the apparatus in a second mode of operation in which said tether contributes to the resiliency of the flexible tube.

5. The apparatus of claim 1 in combination with a tether selectively connectable to said striking surface to reach downward therefrom and connect to a floor-based tether point so that said tether constrains movement of the striking surface relative to said tether point for use of the apparatus in a second mode of operation in which said tether contributes to the resiliency of the flexible tube.

6. The apparatus of claim 4 in combination with said floor based tether point, which comprises a weight configured for non-anchored placement on a ground surface, and featuring a connection point on said weight for said tether.

7. The apparatus of claim 5 in combination with said floor based tether point, which comprises a weight configured for non-anchored placement on a ground surface, and featuring a connection point on said weight for said tether.

8. The apparatus of claim 5 wherein the striking surface, at a central location at the underside thereof, comprises a fabric loop by which the tether is selectively connectable to said striking surface.

9. A method of using the apparatus of claim 5 comprising:
using the striking bag without the tether in a first mode of operation, in which the resiliency of the flexible tube is defined solely by the flexible tube and the threaded rod, and optionally the foam piece of the ceiling mount, if included, wherein said use in the first mode includes impacting the striking surface from below; and
subsequently connecting the tether between the striking bag and the ground based tether point and using the striking bag in the second mode of operation, in which impact of the striking surface from below is obstructed by presence of the tether, while a responsive character of the striking bag is modified compared to the first mode due to added constraint of the striking bag's movement by the tether.

10. An apparatus comprising:
a ceiling mount configured for mounting in an installed position against a ceiling surface and having a threaded hole defined in a stationary position at an underside of the ceiling mount in a rigid portion thereof;
a striking bag comprising:
a resiliently flexible tube of foam material configured to have an upper end thereof connected to the ceiling mount to support the resiliently flexible tube in a hanging position extending downwardly therefrom in an axial direction defined by a central axis of the threaded hole of the ceiling mount;
a threaded rod that is shorter in length than the flexible tube, is received in a hollow opening of the flexible tube at the upper end thereof, is fixed to said flexible tube within the hollow opening thereof, and extends from the second opposing end of the flexible tube for releasable threaded coupling to the mount at the threaded hole therein to hold said threaded rod in stationary relation to the rigid portion of the mount, the foam material of the flexible tube and the threaded rod cooperatively and entirely defining a resiliency of the flexible tube, relative to the rigid portion of the ceiling mount, by which the flexible tube is biased into a straight position extending linearly along the central axis; and
a striking surface that is connected to a bottom end of the flexible tube in a position hanging therebeneath and defines a widest portion of the striking bag, wherein an underside of the striking surface is configured to reside in an exposed position unobstructed by the ceiling mount and the resiliently flexible tube and strikeable from below;
wherein, solely by the resiliency of the flexible tube relative to the rigid portion of the mount, as cooperatively defined by the foam material and the threaded rod, the striking bag is biased into a default relaxed state in which the flexible tube occupies the straight position extending linearly along the central axis.

11. The apparatus of claim 10 wherein the ceiling mount is entirety rigid throughout.

12. The apparatus of claim 10 wherein the rigid portion of the ceiling mount comprises a rigid plate.

13. The apparatus of claim 12 wherein said ceiling mount comprises only said rigid plate.

14. The apparatus of claim 10 wherein an entirety of said ceiling mount is metal.

15. The apparatus of claim 10 wherein the foam material of the flexible tube absorbs noise and dissipates vibration under impact of the striking surface.

16. The apparatus of claim 10 wherein the striking surface, at a central location at the underside thereof, comprises a fabric loop by which a tether is selectively connectable to said striking surface to reach downward therefrom and connect to a floor based tether point so that said tether constrains movement of the striking surface relative to said tether point for use of the apparatus in a second mode of operation in which said tether contributes to the resiliency of the flexible tube.

17. The apparatus of claim 10 in combination with a tether selectively connectable to said striking surface to reach downward therefrom and connect to a floor-based tether point so that said tether constrains movement of the striking surface relative to said tether point for use of the apparatus in a second mode of operation in which said tether contributes to the resiliency of the flexible tube.

18. The apparatus of claim 17 in combination with said floor based tether point, which comprises a weight configured for non-anchored placement on a ground surface, and featuring a connection point on said weight for said tether.

19. The apparatus of claim 18 wherein the striking surface, at a central location at the underside thereof, comprises a fabric loop by which the tether is selectively connectable to said striking surface.

20. A method of using the apparatus of claim 17 comprising:
 using the striking bag without the tether in a first mode of operation, in which the resiliency of the flexible tube is defined solely by the flexible tube and the threaded rod, wherein said use in the first mode includes impacting the striking surface from below; and
 subsequently connecting the tether between the striking bag and the ground based tether point and using the striking bag in the second mode of operation, in which impact of the striking surface from below is obstructed by presence of the tether, while a responsive character of the striking bag is modified compared to the first mode due to added constraint of the striking bag's movement by the tether.

* * * * *